Patented Mar. 1, 1932

1,847,664

UNITED STATES PATENT OFFICE

ADOLPHE H. NEY, OF NEW YORK, N. Y.; EDNA M. NEY EXECUTRIX OF SAID ADOLPHE H. NEY, DECEASED

FLOTATION OF ORES

No Drawing.   Application filed February 2, 1927. Serial No. 165,493.

This invention relates to a new and improved process for the concentration of ores by the method known as "flotation" and particularly to the use and employment, in said ore concentration process, of chemicals and substances and transformation products thereof, hitherto unknown as being of advantage and use as agents or assisting and auxiliary substances in said ore concentration process as customarily practiced.

In a pending application, Serial Number 157,407, I have described, and claimed, as substances which can be employed with advantage as such flotation agents, the products of reaction of an excess of disulfurdichloride upon aromatic amino compounds with at least one ortho position relative to the amino group free or unsubstituted, said products having been described in British patent specifications #17,417 of 1914 and #18,292 of 1914. In the same aforesaid pending application I have further described and claimed for the same aforesaid purpose, certain transformation products derived from said products of reaction of an excess of disulfurdichloride upon certain aromatic amino compounds, particularly such transformation products which result when said products of reaction of disulfurdichloride upon aromatic amino compounds are subjected, simultaneously or successively, to the action of water, or water and alkali, or water, alkali and air.

I have now discovered that certain other transformation products of the products of reaction of an excess of disulfurdichloride upon aromatic amino compounds with at least one free or unsubstituted ortho position, are also excellent and efficient flotation agents. These transformation products may, for instance, be obtained by allowing carbondisulfide to react upon the aqueous or alcoholic solutions of the products resulting from the action of water and an alkali upon the products of reaction of disulfurdichloride upon aromatic amino compounds. I have further discovered that these new transformation products are substituted mercaptobenzothiazoles and are probably formed from the disulfurdichloride plus amine reaction products in accordance with the following scheme:

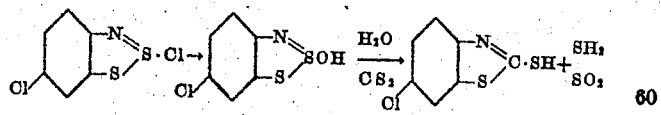

I have, for instance, found that the product obtained by subjecting the product of reaction of disulfurdichloride in excess upon the hydrochloride of para-ethoxy-aminobenzol (para-phenetidine) to the action of alkali and water and treating the alkaline solution of the resulting transformation product with carbondisulfide, a product is obtained which is, after separation and purification identical with 1-mercapto-5-ethoxy-benzo-thiazole M. P. 198°, described by I. B. Sebrell and C. E. Boord, Journal Am. Chem. Soc. 45 (1923) 1290. Similarly, I have found that by subjecting the product of reaction of disulfurdichloride in excess upon the hydrochloride of ortho toluidine to a treatment analogous to that described, 1-mercapto-5-chlor-3-methyl-benzo-thiazole, M. P. 243° a body, as far as I am aware, hitherto unknown, is obtained. (Note: In numbering the positions in the benzo-thiazol ring the method of C. A. Decennial Index 1910—2245 is followed.)

On subjecting the two aforenamed bodies, viz.: 1-mercapto-5-ethoxy-benzo-thiazole, and 1-mercapto-5-chlor-3-methyl-benzo-thiazole, prepared in the manner indicated above from the products of reaction of disulfurdichloride upon para-phenetidine hydrochloride and ortho-toluidine hydrochloride, respectively, to a flotation test, they were found to be most effective in giving a high concentrate. Similar results were obtained when 1-mercapto-benzothiazole, M. P. 177, and 1-mercapto-3-methyl-benzo-thiazole, M. P. 186, obtained by the method described by Romani, Gazz. Chim. Ital. 52, 29, from thiourea with sulfur in case of the former and by one of the methods described by Sebrell and Boord, loc. cit.

from ortho-toluidine dithiocarbamate and sulfur, were employed in analogous flotation tests; when using the disulfides obtained by the action of oxidizing agents upon the mercaptobenzothiazoles, results equal to or but slightly inferior to those obtained with the corresponding mercaptobenzothiazoles themselves were obtained.

Upon subjecting the products of reaction of sulfurdichloride and α and β naphthylamine to the action of water, alkali and carbondisulphide, in a manner analogous to that described in above, new bodies were obtained which are possessed of the character of mercapto-aryl-thiazoles and which also influence in a very marked degree the concentration of ores by flotation.

To illustrate the use of these substances as flotation agents, the following examples are given:

*Example 1*

1200 gr. of a sulphidic copper bearing ore, containing 1.2% cu. were ground to fineness of #60 mesh with some water, 8 gr. slaked lime and 0.15 gr. 1-mercapto-5-ethoxy-benzothiazoles—as obtained by treating the product of reaction of disulfurdichloride upon para-phenetidine with water and alkali, and the resulting alkaline solution with carbondisulfide, and separating the mercaptobenzothiazole by acidulating the solution and filtering and drying the precipitate, as described elsewhere—added and the mixture transferred to a flotation apparatus, water added to the mark and air turned on. Pine oil was added in drops as needed to produce frothing and the froth formed, periodically, removed. After 15 minutes the test was concluded, the froth filtered and dried. It weighed 87.5 gr. and contained 11.75 gr. copper; an extraction of 80% of the copper present was thus effected and a 14% concentrate obtained.

*Example 2*

1000 gr. of the same or used in Example 1 and ground to fineness of #60 mesh were mixed with 5 gr. slaked lime and 0.125 gr. 1-mercapto-benzothiazole, prepared from thiourea according to the method given by Romani, Gazz. Chim. Ital. 52, 29 and the mixture transferred to a flotation test machine and operated in a similar manner as described in Example 1. The froth when dried weighed 57 gr. and contained 10.5 gr. copper; the extraction was therefore 87.5% of the copper present and a 18.6% concentrate obtained.

Similar, and at least in one instance, viz.: with 1-mercapto-5-chlor-3-methyl-benzothiazole, superior results were obtained with other substituted 1-mercapto-benzothiazoles, irrespective of the manner in which they were prepared. Also, disulfides of mercapto-benzothiazoles, as well as the alkali, earth alkali and metallic salts of 1-mercapta-benzo-thiazole and substituted 1-mercapto-benzo-thiazole were found to be effective flotation agents as "promoters"; on the other hand, no or comparatively little effect as a flotation promoter is exercised by the acetyl compound of 1-mercapto-5-chlor-3-methyl-benzothiazole.

It is consequently justified to state that the specific and superior effect of this class of bodies, 1-mercapto-benzothiazole and such homologues and derivatives, which are substituted in the benzol nucleus, is due to the atomic arrangement

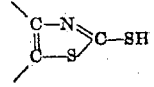

and their property of being capable of assuming a tautomeric form:

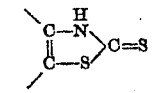

and secondarily, the property of becoming, by the action of oxidizing agents converted into "disulfides",

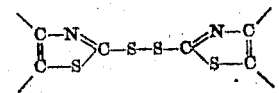

and that all organic bodies similarly constituted are capable in a similar degree, of influencing the separation of metallic sulphides from the gangue under conditions such as are prevalent in the ore separation processes called "flotation" as commonly practiced.

I am well aware that this class of compounds has been recognized and is known as having "par excellence" the property of accelerating the vulcanization of rubber. It is obvious that no relation whatsoever can be deduced from this fact with regard to the property of this class of bodies to be effective flotation agents.

It is understood that my invention is in no wise limited to the proportion of materials used in the examples given, nor to the nature of the subsidiary agents or the type of the ore. Neither would I be restricted to the use of any particular method or modus of working or operation, or to any particular type of apparatus or machinery, all of these things being capable of variation and modification according to the nature of the ore treated and the result desired.

No claim is made in this application to the new method of preparing certain substituted 1-mercaptobenzothiazole from the products of reaction of disulfurdichloride upon aromatic amines, which is to form the subject of a separate application.

Having thus described the nature of my said invention and in what manner it may be applied, I declare that what I claim is:

1. In the process of concentrating ores and minerals by flotation, the step which comprises subjecting the ore in the form of a pulp to a froth flotation operation in the presence of 1-mercapto-benzothiazole substituted in the benzol nucleus by two methyl groups.

2. In the process of concentrating ores and minerals by flotation, the step which comprises subjecting the ore in the form of a pulp to a froth flotation operation in the presence of 1-mercapto-benzothiazole substituted in the benzol nucleus by two methyl groups and halogen.

3. In the process of concentrating ores and minerals by flotation, the step which comprises subjecting a sulphide ore in the form of a pulp to a froth flotation operation in the presence of 1-mercapto-5-chlor-benzo-thiazole.

4. In the process of concentrating ores and minerals by flotation, the step which comprises subjecting a sulphide ore in the form of a pulp to a froth flotation operation in the presence of 1-mercapto-3-methyl-5-chlor-benzothiazole.

5. The process of concentrating a complex ore, which includes agitating a pulp of the ore with 1-mercapto-5-chlor-benzo-thiazole and a frothing agent to form a mineral-bearing froth relatively rich in one of the minerals and separating the froth so obtained.

Signed at New York city, in the county of New York and State of New York this twentieth day of December, A. D. 1926.

ADOLPHE H. NEY.